(12) United States Patent
Turner

(10) Patent No.: US 8,141,569 B2
(45) Date of Patent: Mar. 27, 2012

(54) CONCEALED FLUID DISTRIBUTION CONDUIT SYSTEM

(75) Inventor: Barry S. Turner, Novi, MI (US)

(73) Assignee: Belanger, Inc., Northville, MI (US)

(*) Notice: Subject to any disclaimer, the term of this patent is extended or adjusted under 35 U.S.C. 154(b) by 520 days.

(21) Appl. No.: 12/371,742

(22) Filed: Feb. 16, 2009

(65) Prior Publication Data

US 2010/0206961 A1 Aug. 19, 2010

(51) Int. Cl.
*B08B 3/00* (2006.01)
*B08B 3/04* (2006.01)
*B08B 9/00* (2006.01)

(52) U.S. Cl. .................... 134/123; 134/198; 134/199

(58) Field of Classification Search .............. 134/123, 134/198, 199
See application file for complete search history.

(56) References Cited

U.S. PATENT DOCUMENTS

| | | | |
|---|---|---|---|
| 4,744,535 A * | 5/1988 | Patenaude | 248/74.1 |
| D327,130 S | 6/1992 | Belanger et al. | |
| 5,535,545 A * | 7/1996 | Matz | 47/33 |
| D375,389 S | 11/1996 | Belanger et al. | |
| 6,571,527 B1 * | 6/2003 | Rattini | 52/692 |
| 7,034,221 B2 * | 4/2006 | Johnston et al. | 52/220.7 |
| 2006/0191561 A1 * | 8/2006 | Mey et al. | 134/123 |
| 2007/0209129 A1 * | 9/2007 | Turner | 15/53.2 |
| 2007/0221759 A1 * | 9/2007 | Weyandt et al. | 239/548 |
| 2008/0128095 A1 * | 6/2008 | Van Zutven | 160/22 |

* cited by examiner

*Primary Examiner* — Michael Barr
*Assistant Examiner* — Charles W Kling
(74) *Attorney, Agent, or Firm* — Young Basile Hanlon & MacFarlane PC

(57) ABSTRACT

A structural member is designed to define a fluid distribution conduit receiving cavity within its interior volume. An elongate extruded plastic cover snap-fits onto the member to conceal the conduit but permits nozzles and the like to extend therethrough so that fluid may be distributed from the conduit and/or serviced as necessary without removing the cover. The cover effectively supports the conduit by trapping it against a compression pad on the cavity floor.

5 Claims, 4 Drawing Sheets

CONCEALED FLUID DISTRIBUTION CONDUIT SYSTEM

FIELD OF THE INVENTION

This invention relates to fluid distribution systems of the type used in car wash installations and more particularly to a system for concealing one or more fluid distribution conduits within a structural component.

BACKGROUND OF THE INVENTION

Car wash installations, whether they be of the drive-through or rollover type, typically comprise structural members used to define vertical supports, arches, bridges, and other elements of the installation. Fluid distribution conduits, i.e., pipes and hoses for conveying chemicals, wash water and rinse water, are typically mounted by brackets, clamps and screws to the exterior of structural members such that the entire installation has an institutional appearance essentially lacking in aesthetic appeal. To offset this institutional appearance to some degree, pipes are sometimes polished or plated or covered with plastic sheathing, and lights are used to draw the attention of the customer to services being carried out at a particular time.

SUMMARY OF THE INVENTION

In accordance with the present invention, the aesthetic appearance as well as the overall utility of a car wash installation is improved by concealing fluid distribution conduits such as pipes and hoses within elongate tubular structural members which themselves are configured to define one or more conduit cavities. Extruded polymeric covers overlie and conceal the cavities and the conduits therein; such covers are attached to the structural members by a snap-fit to complete the concealment as well as to provide a degree of structural support for spray nozzles and/or other appendages affixed to the concealed conduit or conduits.

In an illustrative embodiment of the invention hereinafter described in detail, the structural member is extruded from aluminum to define an essentially hollow body having a substantially continuously contoured outer wall which is reentrant; i.e., the wall turns in on itself to define a conduit cavity extending the full length of the extruded structural member. The fluid cavity is characterized by an interior volume of sufficient sizes to accommodate therein at least one fluid distribution conduit or pipe. The cavity has opposite spaced-apart shoulders which are adapted to receive in snap-in relation, the resilient legs of an elongate extruded plastic cover, the outer contours of which generally conform to the overall outer contour of the structural member.

The fluid conduit is trapped between the cover and base or floor of the cavity to stabilize it within the support structure. A compression pad can be placed between the conduit and the floor of the cavity to provide resilience and to relax tolerances in the associated structural components. Thus, the cover clamps the conduit in place. As illustrated in the following, nozzle assemblies including appropriate adapters are threaded into tapped holes which are formed in the sidewalls of the fluid conduit at appropriate spacings so as to extend through registering holes in the extruded plastic cover to hold the nozzles and conduit in place while allowing access to the nozzles for replacement or service without the need to remove the cover.

BRIEF DESCRIPTION OF THE DRAWINGS

The description herein makes reference to the accompanying drawings wherein like reference numerals refer to like parts throughout the several views, and wherein.

DETAILED DESCRIPTION OF AN ILLUSTRATIVE EMBODIMENT

Figure 1:
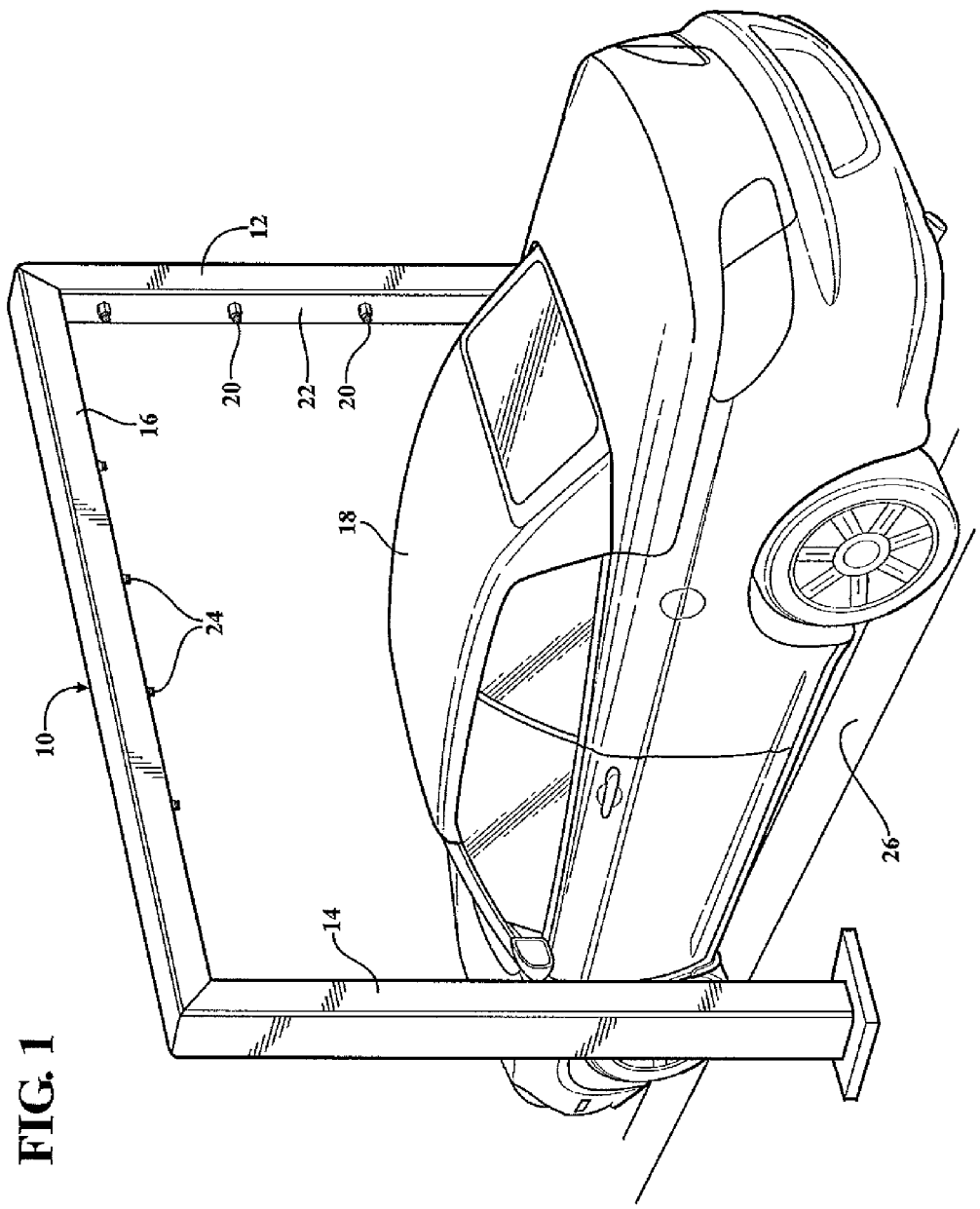
FIG. 1 is a perspective view of a car wash spray arch embodying the invention.

FIG. 1 shows a car wash spray arch 10 comprising extruded aluminum vertical supports 12, 14 joined by an upper horizontal support 16. The size and shape of the arch 10 is such as to allow a vehicle 18 to pass between the vertical supports 12, 14 and beneath the horizontal support 16 to undergo a car wash procedure such as rinsing or application or prewash chemical by way of nozzles 20, 24 projecting outwardly from cover plates 22 which run the length of the arch structures 12, 14 and 16. The vehicle 18 is conveyed through the arch 10 by a conveyor (not shown) which extends along a path 26 which passes through other car wash stations.

Figure 2:
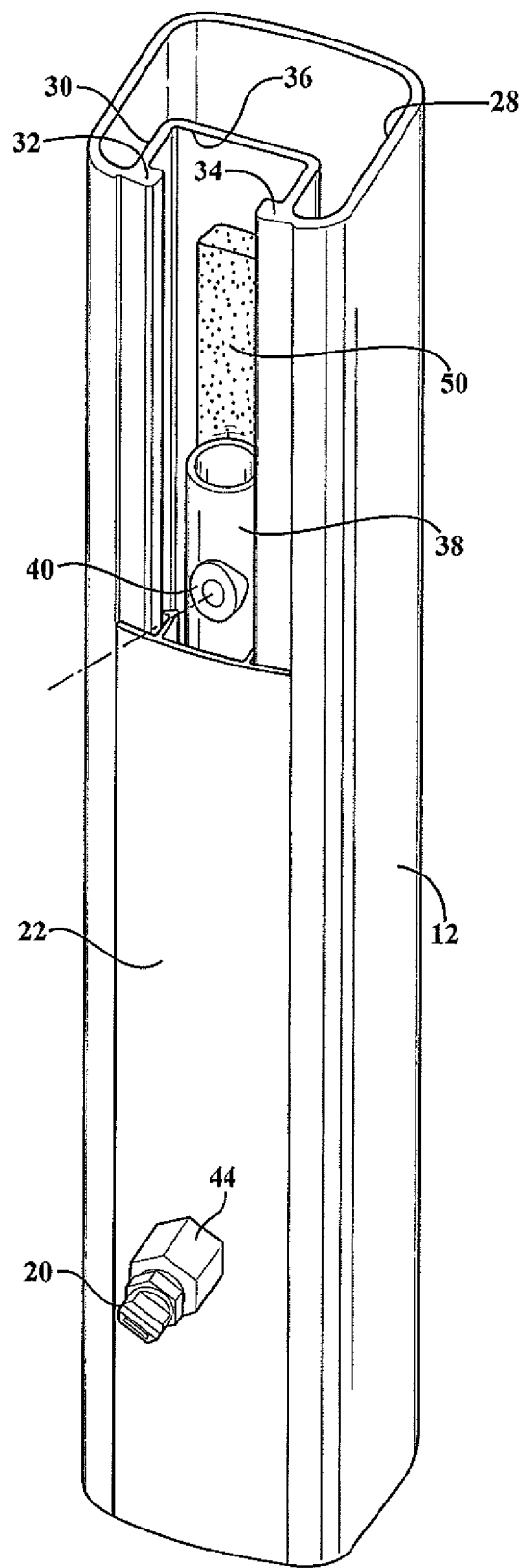
FIG. 2 is a perspective view of a portion of a vertical member in the assembly of FIG. 1 with parts cut away
Figure 3:
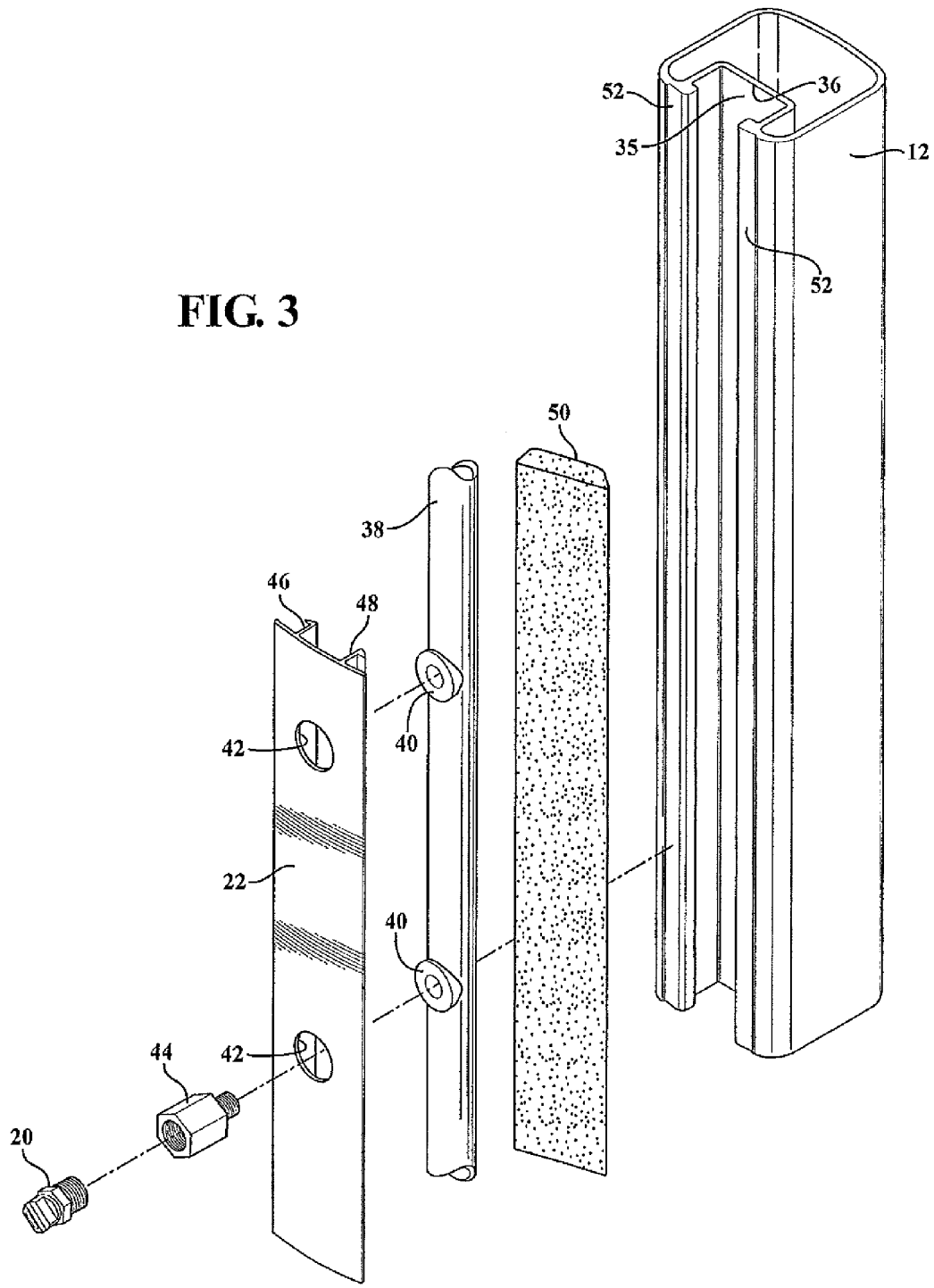
FIG. 3 is an exploded view of the FIG. 2 structure.
Figure 4:
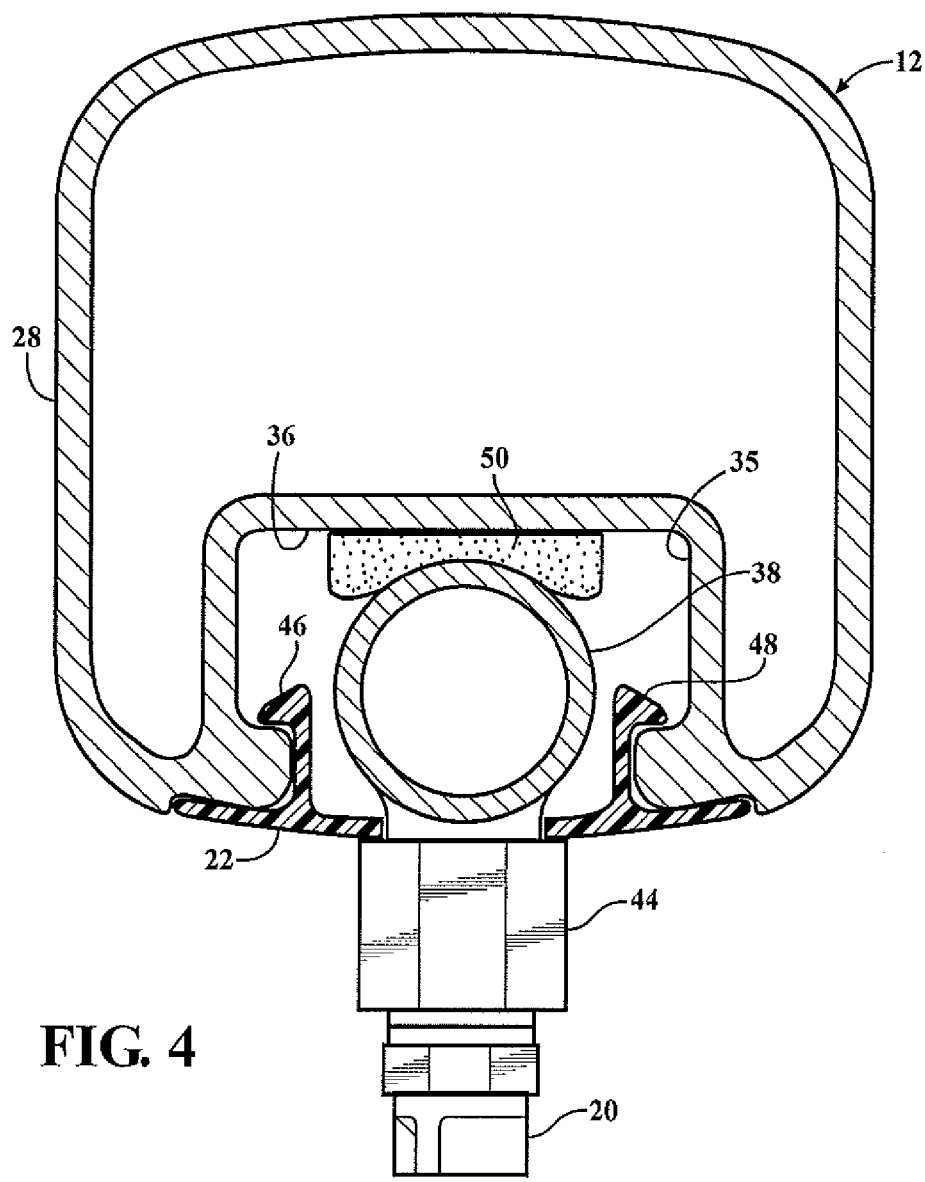
FIG. 4 is a sectional view of the apparatus of FIG. 2.

Referring now to FIGS. 2 through 4, details of the support structure 12 and the components associated therewith to create a concealed fluid distribution system will be described. It is to be understood that this description is also representative of the structures 14, 16. The support structure 12 is extruded in the form of a hollow shape having an essentially square cross-section and a contoured exterior wall 28. The corners are rounded. The wall 28 is reentrant; i.e., turns in on itself to form a longitudinally extending fluid conduit cavity 35 having a wall 30 and an interior floor 36. The die which is used to form the aluminum extrusion making up the support 12 is also such as to form spaced-apart opposed shoulders 32, 34 at the entrance to the cavity 35. The size and shape of the fluid conduit cavity is such as to accommodate fully therein a fluid distribution conduit 38 which may be metal or plastic, depending on the pressure requirements of the fluid being conveyed therethrough. The fluid conduit 38 extends to a source (not shown) of fluid such as a wash or prewash solution or a rinse water which is sprayed through the nozzles 20, 24 onto the surfaces of the vehicle 18 as it passes through the arch 10 as shown in FIG. 1.

As best shown in FIG. 3, the conduit 38 is subjected to a process known as "flow drilling" to form holes surrounded by bosses or seats 40 at desired intervals corresponding to the spacing between the nozzles 20, 24 in an operative system.

The raised bosses or seats 40 are tapped through to the interior of the conduit 30 to receive screw-in adapters 44 which are of conventional design and adapted to receive conventional spray nozzles 20, 24 therein.

A cover plate 22 is formed of extruded plastic in any of a variety of aesthetically pleasing colors and textures and is characterized by a contoured outer surface and, on the interior side, opposed longitudinally extending and spaced apart resilient legs 46, 48 having end nibs so as to resiliently spring inwardly to allow insertion of the cover plate into the opening formed by the shoulders 32, 24 and then to snap-fit around the bottoms of the shoulders as shown in FIG. 4, to securely hold the cover plate 22 in place. Holes 42 are formed by saw-cutting the material of the plastic cover plate 22 at locations which register with the bosses or seats 40 formed in the fluid conduit 38 so as to allow the adapter 44 to pass through the hole 42 and be threaded into the seat 40. A resilient compression pad 50 is preferably placed beneath the conduit 48 as shown in FIG. 3 to resiliently trap the conduit 38 between the cover plate 22 and the floor 36 to hold the conduit in place when the cover plate 22 is installed. Reliefs 52 may be formed in the aluminum extrusion 12 to provide a flush fit for the outer edges of the cover plate 22 as shown in FIG. 4.

This assembly allows the adapters 44 and/or the nozzles 20, 24 to be removed for service and/or replacement without removing the cover plate 22 from any of the structural supports which make up the arch 10. It further eliminates the necessity for hanging clamps and brackets on the exterior of the supports 12, 14 and 16 and running pipes or conduits through them to form fluid distribution and spray systems.

The structural member 12, 14 and 16 may assume various shapes and may include interior ribs as described in my co-pending application Ser. No. 11/371,483 filed Mar. 9, 2006 and assigned to Belanger, Inc. of Northville, Mich.

What is claimed is:

1. A concealed fluid distribution conduit and structural car wash system comprising:
   an elongate, rigid extruded structural member having an outer wall, said outer wall over a portion of its extent turning inwardly to define within said structural member an open, elongate conduit cavity of sufficient size as to accommodate therein at least one fluid distribution conduit;
   a fluid distribution conduit in said conduit cavity having a series of spaced-apart, flat faced bosses formed on an outer surface thereof wherein said bosses have central bores extending into said fluid distribution conduit for fluid communication therewith;
   an elongate extruded plastic cover joined onto said structural member to effectively close said conduit cavity and conceal said fluid distribution conduit when installed therein; and
   a plurality of spray nozzles mounted to said bosses and extending through said plastic cover and in fluid communication with said fluid distribution conduit.

2. An apparatus as defined in claim 1 further comprising at least one compression pad disposed between the fluid distribution conduit and the interior of said conduit cavity, said fluid distribution conduit being effectively clamped in position between said plastic cover and said compression pad.

3. An apparatus as defined in claim 1 wherein the conduit cavity defines opposite, spaced-apart, longitudinally extending shoulders, said plastic cover having resilient legs which snap onto and between said shoulders to attach said plastic cover to said structural member.

4. An apparatus as defined in claim 1 wherein said structural member is extruded aluminum.

5. An apparatus as defined in claim 1 wherein said plastic cover is made at least in part from extruded plastic and has a plurality of spaced holes formed therein to register with said spray nozzles and bosses; said bosses having flat seats to receive said spray nozzles.

* * * * *